United States Patent [19]
Winner

[11] Patent Number: 5,921,115
[45] Date of Patent: *Jul. 13, 1999

[54] SECURITY DEVICE

[75] Inventor: Kevin D. Winner, Hermitage, Pa.

[73] Assignee: Winner International Royalty L.L.C., Sharon, Pa.

[*] Notice: This patent is subject to a terminal disclaimer.

[21] Appl. No.: 08/442,816

[22] Filed: May 17, 1995

Related U.S. Application Data

[63] Continuation-in-part of application No. 08/233,291, Apr. 26, 1994, Pat. No. 5,488,844.

[51] Int. Cl.$^6$ .................................................. E05B 67/22
[52] U.S. Cl. ...................... 70/18; 70/54; 70/39; 70/38 A; 70/233; 70/DIG. 43
[58] Field of Search ..................................... 70/233, 38 A, 70/38 B, 38 C, 39, 18, 54–56, 38 R, 53, 20, 14, 24–26, DIG. 56, DIG. 43, 258, 260

[56] References Cited

U.S. PATENT DOCUMENTS

| | | | |
|---|---|---|---|
| 577,673 | 2/1897 | Wickliffe | 70/18 |
| 596,237 | 12/1897 | Damon | 70/39 |
| 929,910 | 8/1909 | Wood | 70/16 |
| 1,250,668 | 12/1917 | Rzeszuto | 70/38 |
| 1,461,725 | 7/1923 | Cooper . | |
| 1,515,302 | 11/1924 | George . | |
| 1,543,397 | 7/1925 | Schroeder . | |
| 1,688,208 | 10/1928 | Del Rosso | 70/25 |
| 2,375,488 | 5/1945 | Olson | 70/54 |
| 2,777,315 | 1/1957 | Burke | 70/144 |
| 3,430,469 | 3/1969 | Baxter et al. | 70/388 |
| 3,805,564 | 4/1974 | Velardo | 70/18 |
| 4,064,716 | 12/1977 | Shwayder et al. | 70/38 |
| 4,085,600 | 4/1978 | Bindari | 70/39 |
| 4,277,094 | 7/1981 | Roue | 296/1 |
| 4,738,127 | 4/1988 | Johnson | 70/209 |
| 4,856,308 | 8/1989 | Johnson | 70/209 |
| 4,888,967 | 12/1989 | Kuo | 70/233 |

(List continued on next page.)

FOREIGN PATENT DOCUMENTS

| | | |
|---|---|---|
| 201424 | 4/1956 | Australia . |
| 3407289 | 10/1992 | Australia . |
| 0198772 | 10/1986 | European Pat. Off. . |
| 2495555 | 6/1982 | France ...................................... 70/237 |
| 4011836 | 10/1990 | Germany . |
| 9210169 | 11/1992 | Germany . |
| 9302542 | 7/1993 | Germany . |
| 145260 | 11/1990 | Taiwan . |
| 77205727A02 | 2/1991 | Taiwan . |
| 2157756 | 10/1975 | United Kingdom ...................... 70/233 |
| 2134463 | 8/1984 | United Kingdom . |
| 2171968 | 3/1985 | United Kingdom . |

OTHER PUBLICATIONS

Copies of photocopies of CYCLOK booth in Las Vegas Interbike Show in 1993.
Letter dated Dec. 9, 1994, from Wilson Gunn M'Caw & Co.
Letter dated Oct. 18, 1994, from Wilson Gunn M'Caw & Co.
Letter dated Sep. 29, 1994, from Cyclok.
Performance Bicycle Catalog undated, p. 41.

*Primary Examiner*—Darnell M. Boucher
*Attorney, Agent, or Firm*—Vickers, Daniels & Young

[57] ABSTRACT

A device is adapted for use primarily as a theft deterrent for bicycles, mopeds and other two and three wheeled self propelled or motorized conveyances, said device comprises a pair of opposed, telescopically engaging U-shaped members and locking means associated with said members, securing them from being forcibly pulled apart. The locking means typically includes the use of a pawl and ratchet arrangement for facilitating the engagement of the two members for securing them in locking relationship. The device also includes a compressible and extendible rubber or elastomeric boot preferably in the form of bellows. This boot provides a protective cover around ratchet teeth that are longitudinally spaced along one of the arms of the two U-shaped members. The boot progressively surrounds the ratchet teeth as the rod is disengaged or withdrawn from the sleeve. The cover serves to prevent damage to the individual ratchet teeth, and in addition, provides a level of protection from scratching, chipping or marring the paint or other finish on the bicycle, etc. and injury to persons utilizing or otherwise coming into contact with the security device.

6 Claims, 10 Drawing Sheets

U.S. PATENT DOCUMENTS

| | | | |
|---|---|---|---|
| 4,918,949 | 4/1990 | Newbold | 70/38 |
| 4,920,772 | 5/1990 | Denison | 70/53 |
| 4,935,047 | 6/1990 | Wu | 70/209 |
| 4,961,331 | 10/1990 | Winner | 70/209 |
| 5,031,428 | 7/1991 | Jan et al. | 70/209 |
| 5,092,146 | 3/1992 | Wang | 70/209 |
| 5,181,403 | 1/1993 | Lii | 70/233 |
| 5,199,282 | 4/1993 | Wang | 70/38 |
| 5,253,496 | 10/1993 | Wang | 70/38 |
| 5,253,497 | 10/1993 | Hsieh | 70/226 |
| 5,277,042 | 1/1994 | Tobias | 70/209 |
| 5,331,830 | 7/1994 | Su | 70/38 |
| 5,394,712 | 3/1995 | Chou | 70/38 |
| 5,398,529 | 3/1995 | Goldman | 70/38 |
| 5,406,811 | 4/1995 | Nakai | 76/26 |
| 5,406,812 | 4/1995 | Jaw | 70/38 |
| 5,438,854 | 8/1995 | Seraj | 70/38 A |

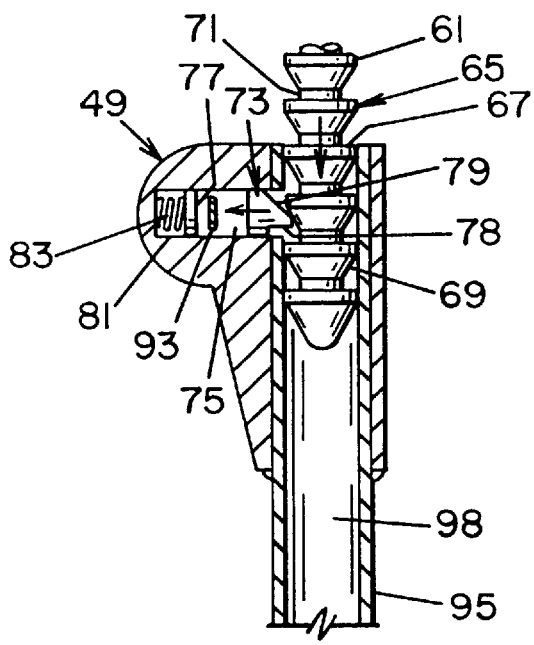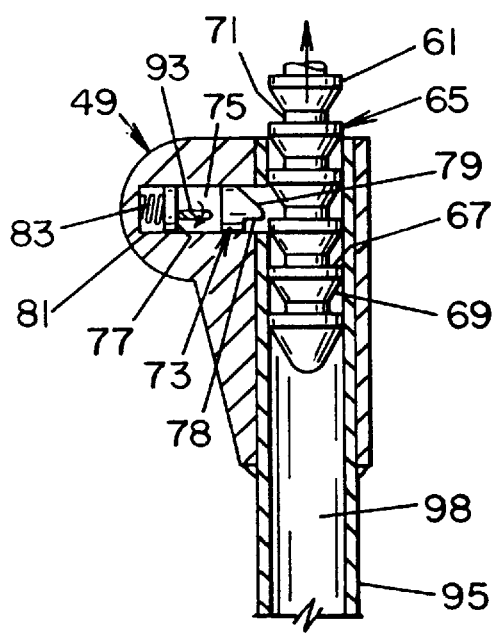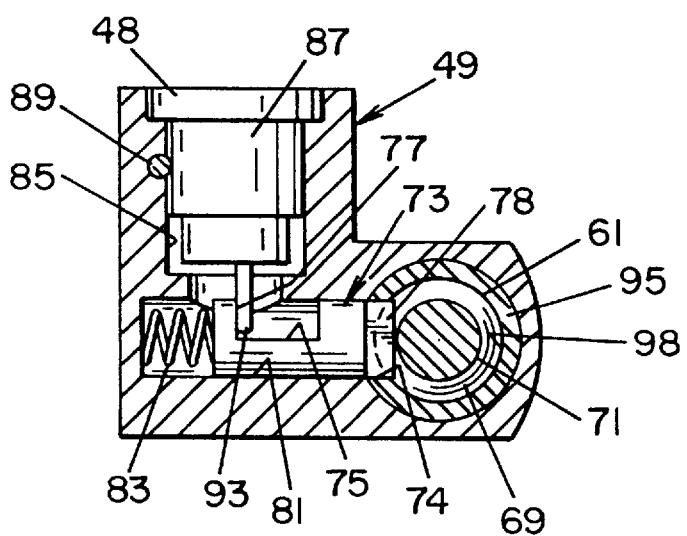

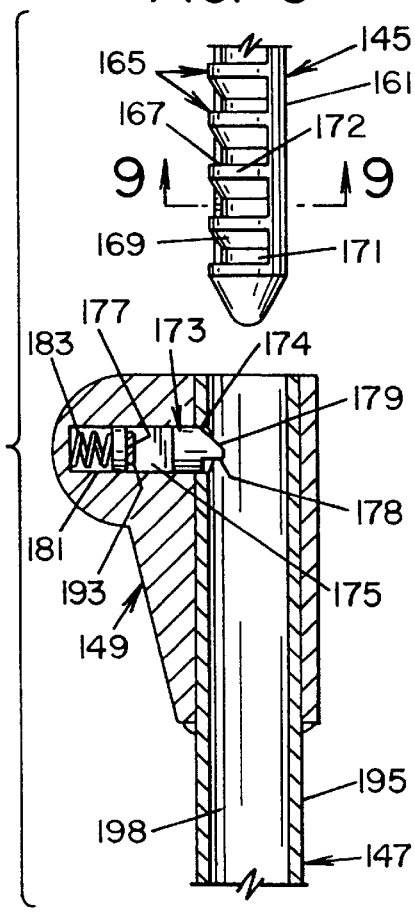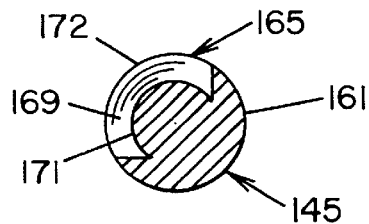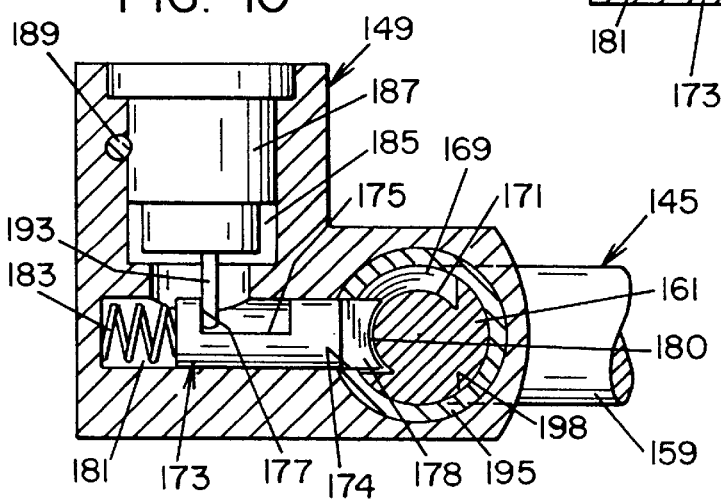

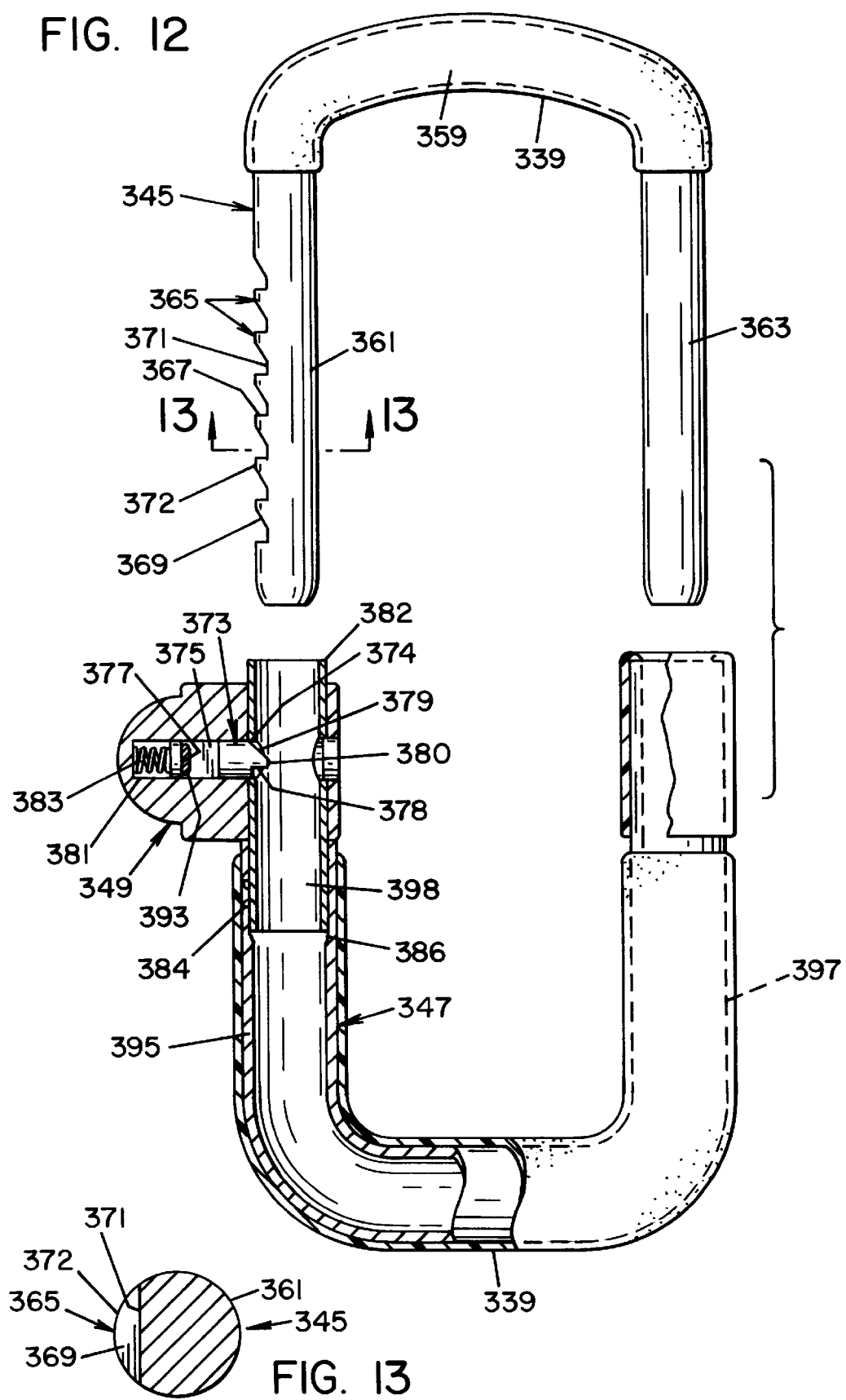

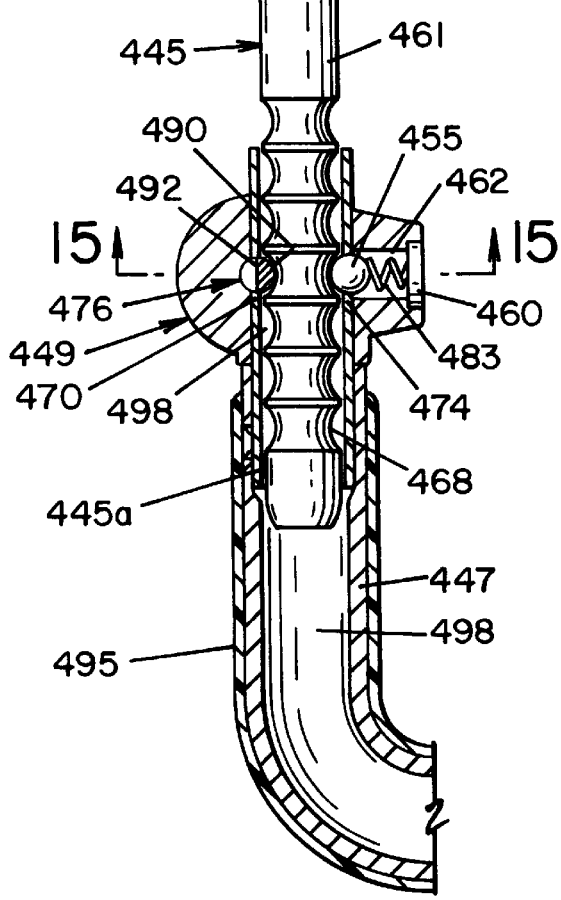
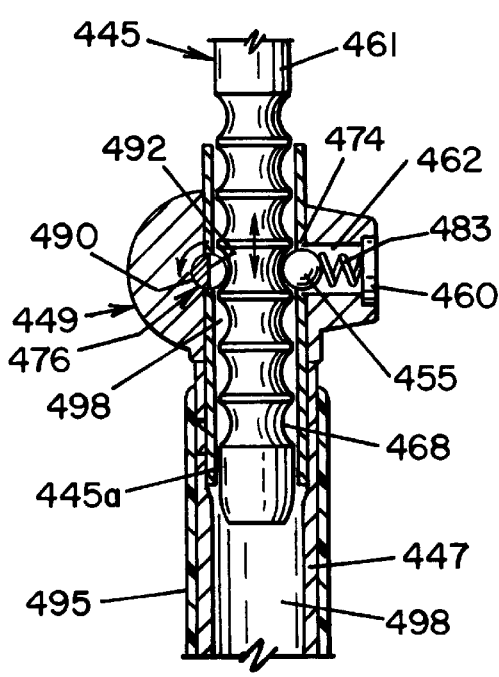
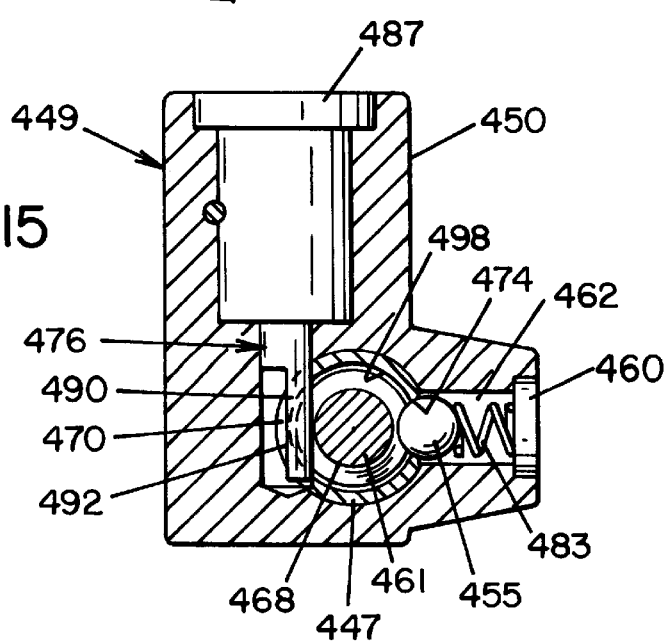

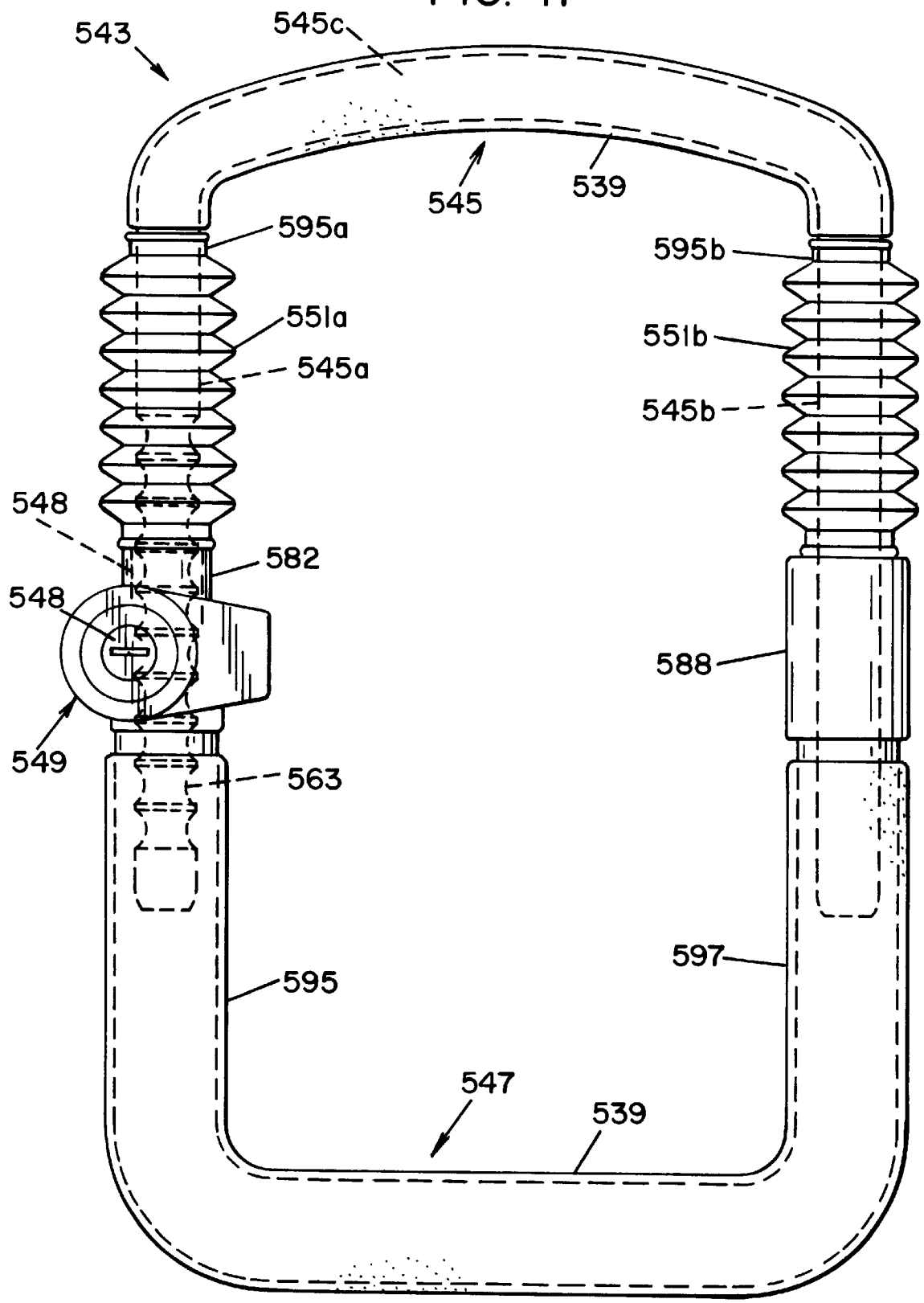

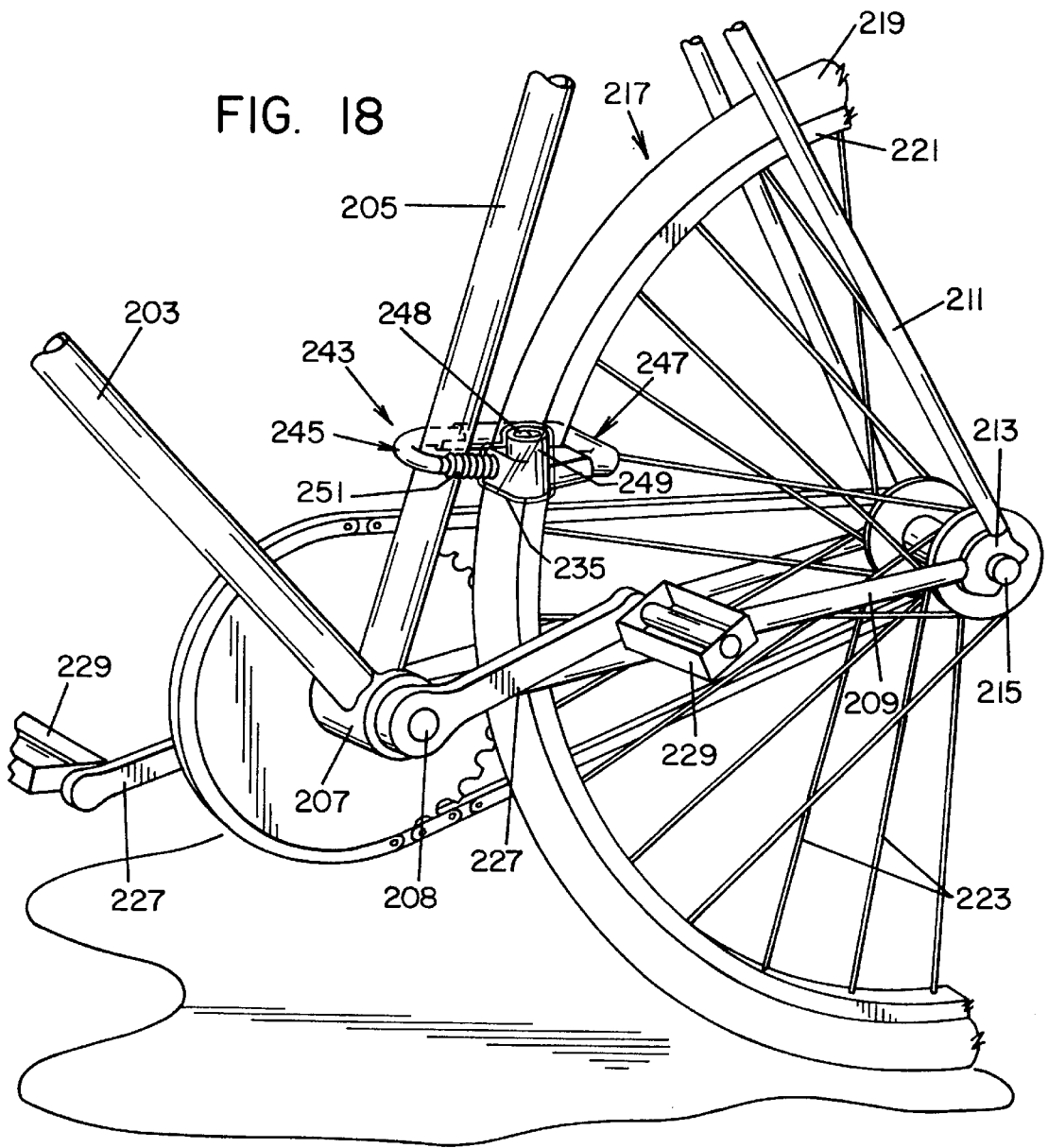

SECURITY DEVICE

CROSS REFERENCE TO RELATED APPLICATIONS

This application is a continuation-in-part of patent application Ser. No. 08/233,291, filed Apr. 26, 1994, now U.S. Pat. No. 5,488,844.

FIELD OF THE INVENTION

This invention relates to a security device, more particularly a theft prevention device for use on bicycles, motorcycles, mopeds and other conveyance means. Yet more particularly, the invention relates to a lockable device useful for coupling a two or three wheeled conveyance to a fixed object such as a pole or a bike rack to insure safety from theft. The device is also useful for securing one or more wheels or other removable parts of e.g. a bicycle, to the bike frame to deter theft of the parts.

BACKGROUND OF THE INVENTION

As a means of transportation, bicycles have been around for hundreds of years. In certain cultures and countries, bicycles are a mode of transportation which rivals or exceeds cars in popularity and in practicality.

In recent years, high-tech, high-performance bicycles costing many hundreds and even thousands of dollars have been developed. These bicycles typically may use lightweight, expensive alloys, or composites for the component parts. They often include elaborate shifting, gearing and braking mechanisms. When left alone even for a few minutes, these expensive bicycles increasingly have become the target of random and organized theft. Concurrently, the growth in the theft of these expensive bicycles has compelled the development of theft deterrent devices and systems ranging in complexity from simple chain padlock combinations to sophisticated, expensive electronic warning devices.

One commonly used device comprises a hardened metal U-shaped member with a bar extending through the ends of the U, lockable into place. The device enables the owner to secure a bike or similar device to a light post, bike rack or other secure object. However, the device lacks the feature of adjustability to accommodate different types of bikes, bike configurations, and anchoring devices. Thus, it is necessary for bike stores to inventory several sizes of this device to permit each purchaser to buy the size needed for his or her particular style and size of bike.

Many of the other prior art devices such as padlocks and chains are deficient in one or more respects such as strength, ease with which the lock can be picked or broken even by a relatively inexperienced thief, and stowability when not in use.

SUMMARY OF THE INVENTION

These and other drawbacks are overcome by the present invention which is a theft deterrent device or security system comprising a pair of opposed, generally U-shaped members, each member having a pair of parallel arms, the arms of one member being slidably engaged with the parallel arms of the other member. A lock means is associated with said U-shaped members to allow said members to be slid together, while at the same time securing the members from being pulled apart. The first U-shaped member contains a plurality of ratchet teeth spaced longitudinally along one of the parallel arms. The lock means includes a pawl adapted to engage the ratchet teeth to permit sliding of the U-shaped members together while preventing the members from being pulled apart when the lock means is locked. The second U-shaped member includes a tubular sleeve to slidably receive said arm containing the ratchet teeth. Each ratchet tooth includes a stop surface generally at right angles to the axis of the arm and a second surface extending diagonally inwardly from the radial outer edge of the stop surface. The diagonal surfaces of the teeth are arranged along the arm whereby relative movement is limited to the closing direction toward the bight when the device is locked. Free movement of the two members in the closing direction and in the opening direction to separate them is possible only when the device is unlocked. The ratchet teeth partially or completely circumscribe the arm.

In another embodiment the device includes a plurality of semi-circular grooves evenly spaced longitudinally along at least one of the arms of the first U-shaped member. The grooves partially or completely circumscribe the arm in a generally radial direction or alternatively in a helical or spiral pattern. The lock is contained in a housing and includes spring, lever or cam biased means for positioning a sleeve of the second U-shaped member at any point along the arms and a locking mechanism for engaging the grooves. The positioning means includes a blind hole at right angles to said passageway, an opening communicating with the passageway and a spring biased bearing extending into said opening to partially intersect the passageway and to contact the grooves. Movement of the sleeve along the grooves is freely permitted when the device is unlocked, and the relative movement between the sleeve, and the grooves is prevented when the device is locked.

In yet another aspect of the invention, a security device utilizes a rod slidably received within a cylindrical sleeve wherein the rod contains a plurality of longitudinally spaced lock engaging means comprising ratchet teeth or semi-circular grooves. A flexible protective boot is associated with the rod and is adapted to telescopically cover the lock engaging means comprising teeth or grooves on the rod as the rod is withdrawn from the sleeve. This boot preferably comprises an elastomer or rubber molded in the shape of hollow compressible bellows. As the arm is inserted into the sleeve, the bellows compress together as an accordion. However, as the arm is withdrawn from the sleeve, the bellows resume their natural extended shape, covering the teeth or grooves thereby safeguarding the teeth or grooves from damage and weathering by the elements, while protecting the user from being pinched or cut by the edges of the teeth or grooves, and protecting the surface finish of the bike from scratches or other damage.

It is an object of the present invention to provide a theft deterrent device of the type useful on bicycles, mopeds, and other two and three wheeled conveyances means, whether self propelled or adapted to be propelled by persons, said security device having greater adaptability than those of the prior art.

Another objective is a security device containing safety features which discourage attempts at theft.

Yet another feature is a bicycle security device that is collapsible to reduce its overall size when not in use, while providing more adaptability in use.

Still another feature is a locking device employing a locking mechanism that is safe to use for security purposes, and that resists disengagement when locked.

BRIEF DESCRIPTION OF THE DRAWINGS

These and other objects which will become apparent upon reading the following description are achieved in the manner to be hereinafter described, with particular reference to the drawings in which;

FIGS. 4 and 5 are enlarged partial cross sectional views of a portion of the lock used in the device of FIGS. 2 and 3 showing movement of the ratchet teeth during engagement and disengagement of the lock;

FIG. 6 is a detailed cross sectional view taken along line 6—6 of FIG. 2 of a lock mechanism useful in connection with the present invention;

FIG. 8 is a view of a variation of the present invention showing ratchet teeth partially circumscribing a rod aligned with a sleeve and lock housing;

FIG. 9 is a cross-sectional view taken along line 9—9 of FIG. 8;

FIG. 10 is a detailed cross sectional view of the lock employing the ratchet teeth shown in FIGS. 8 and 9 with the lock in the closed position;

FIG. 11 is a cross sectional view similar to FIG. 10 with the ratchet arm in the open position;

FIG. 12 shows another configuration of ratchet teeth partially circumscribing a rod engaging a lock mechanism;

FIG. 13 is a cross-sectional view taken along lines 13—13 of FIG. 12;

FIG. 14 is an enlarged partially cut-away view of another embodiment of the locking mechanism of the present invention in the locked position;

FIG. 15 is an enlarged sectional view taken along lines 15—15 of FIG. 14;

FIG. 16 is an enlarged sectional view of the device of FIGS. 14 and 15 shown in the unlocked position;

FIG. 17 shows the security device in the closed and locked position, including the use of a flexible boot on each of the arms; and FIG. 18 is a perspective view similar to FIG. 1 showing a smaller version of the lock of the present invention adapted to secure a wheel of a bicycle to the bicycle frame.

DETAILED DESCRIPTION OF THE INVENTION

Figure 1:
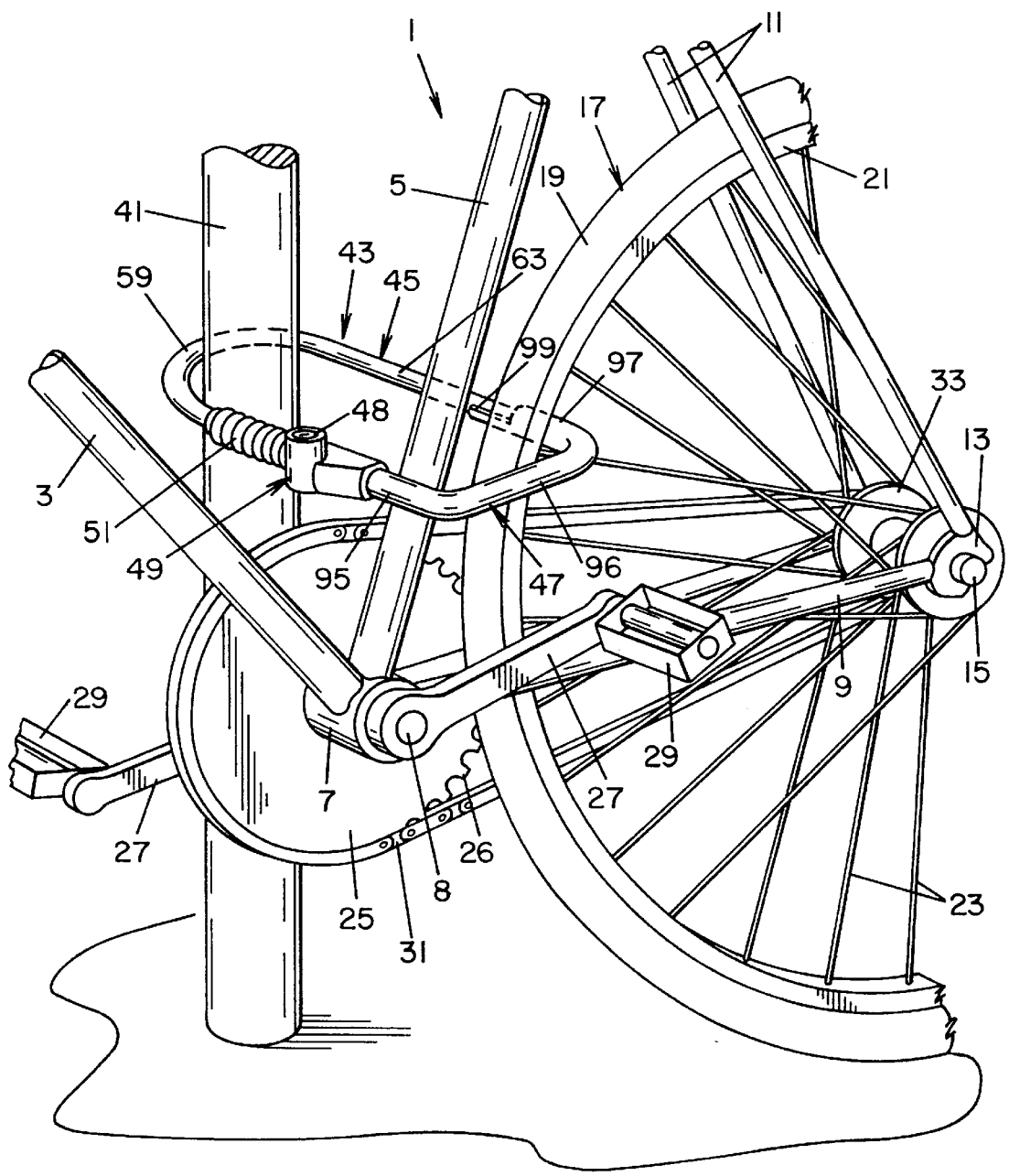
FIG. 1 is a perspective view of a portion of a chain driven bicycle secured to a post by a device of the present invention.

Referring now to the drawings, FIG. 1 shows in perspective a portion of a two wheeled bicycle 1. The frame of the bicycle includes a down tube 3, a seat tube 5 and a chain stay 9 all joined to a bracket shell 7. Shaft 8 extends through bracket shell 7 and is connected to cranks 27. Chainwheel 25 containing a plurality of teeth 26 on the circumference thereof engages chain 31. Two pedals 29 are connected to the cranks 27. The chain stay 9 and seat stay 11 converge to form two dropouts 13 into which the rear wheel axle 15 is secured. The rear wheel 17 comprises a tire 19 mounted on rim 21 held in place around the axle 15 by spokes 23. Teeth (not shown) on free wheel 33 are engaged by chain 31 whereby the bicycle is propelled by a rotational movement of the pedals said movement being transmitted through the chain wheel 25 and chain 31 to free wheel 33.

A security device 43 is shown coupling the bicycle 1 to an immovable post 41. The device comprises a U-shaped rod 45 engaging a U-shaped tubular sleeve 47 and held in position by lock 48. The rod 45 contains a plurality of longitudinally extending lock engaging means comprising ratchet teeth (not shown) covered by flexible boot 51 which is in the shape of a diaphragm or bellows. The sleeve 47 is shown extending around seat tube 5 and wheel 17 to insure not only that the bicycle frame cannot be taken, but that the wheel 17 cannot be readily removed from the dropout 13 and taken while leaving the bike frame secured to the post. Added security can be achieved by disengaging the front wheel from the frame and securing it to the post 41 with the security device 43.

Figure 2:
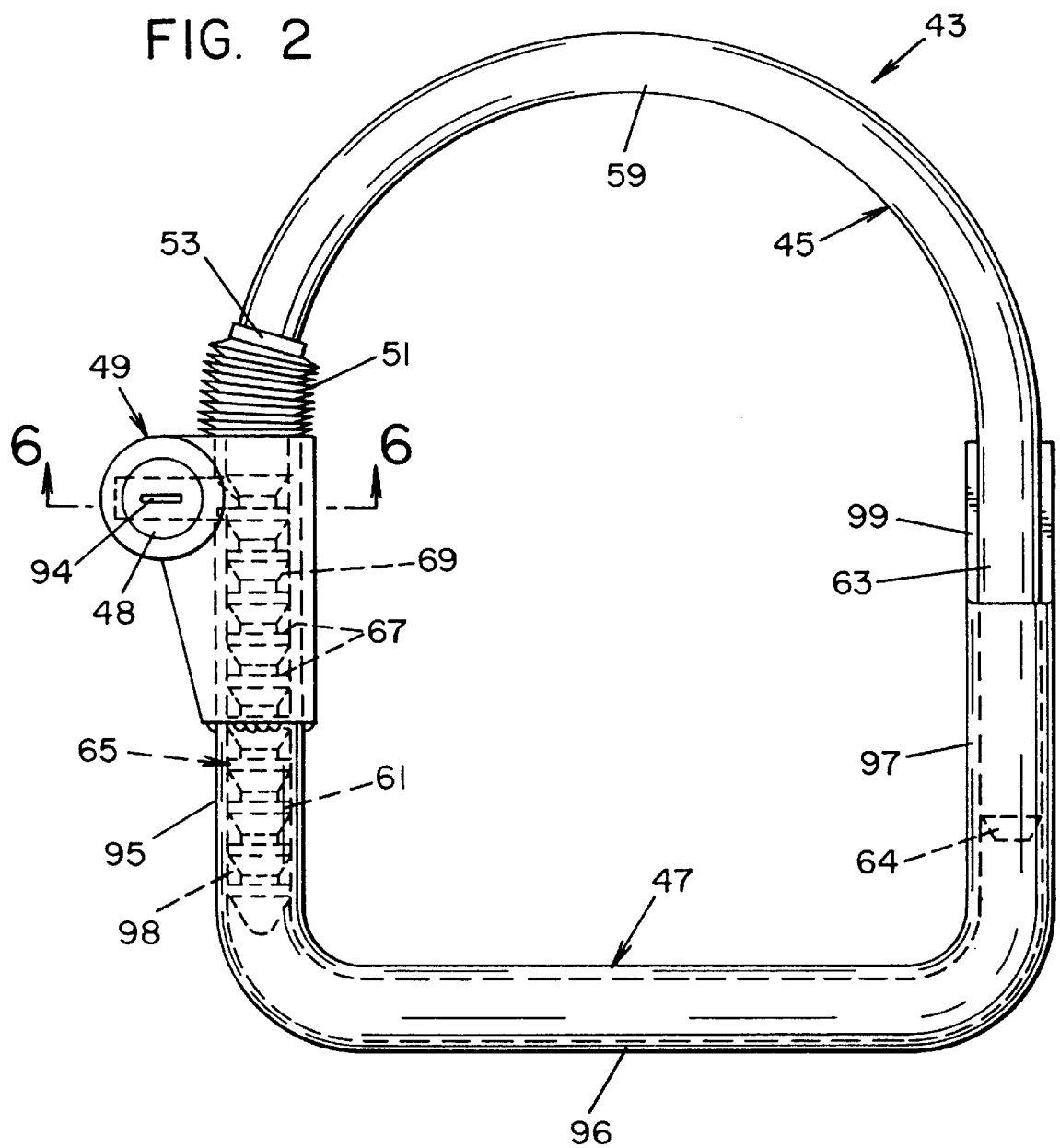
FIG. 2 is an elevational view of an assembled security device of the present invention.
Figure 3:
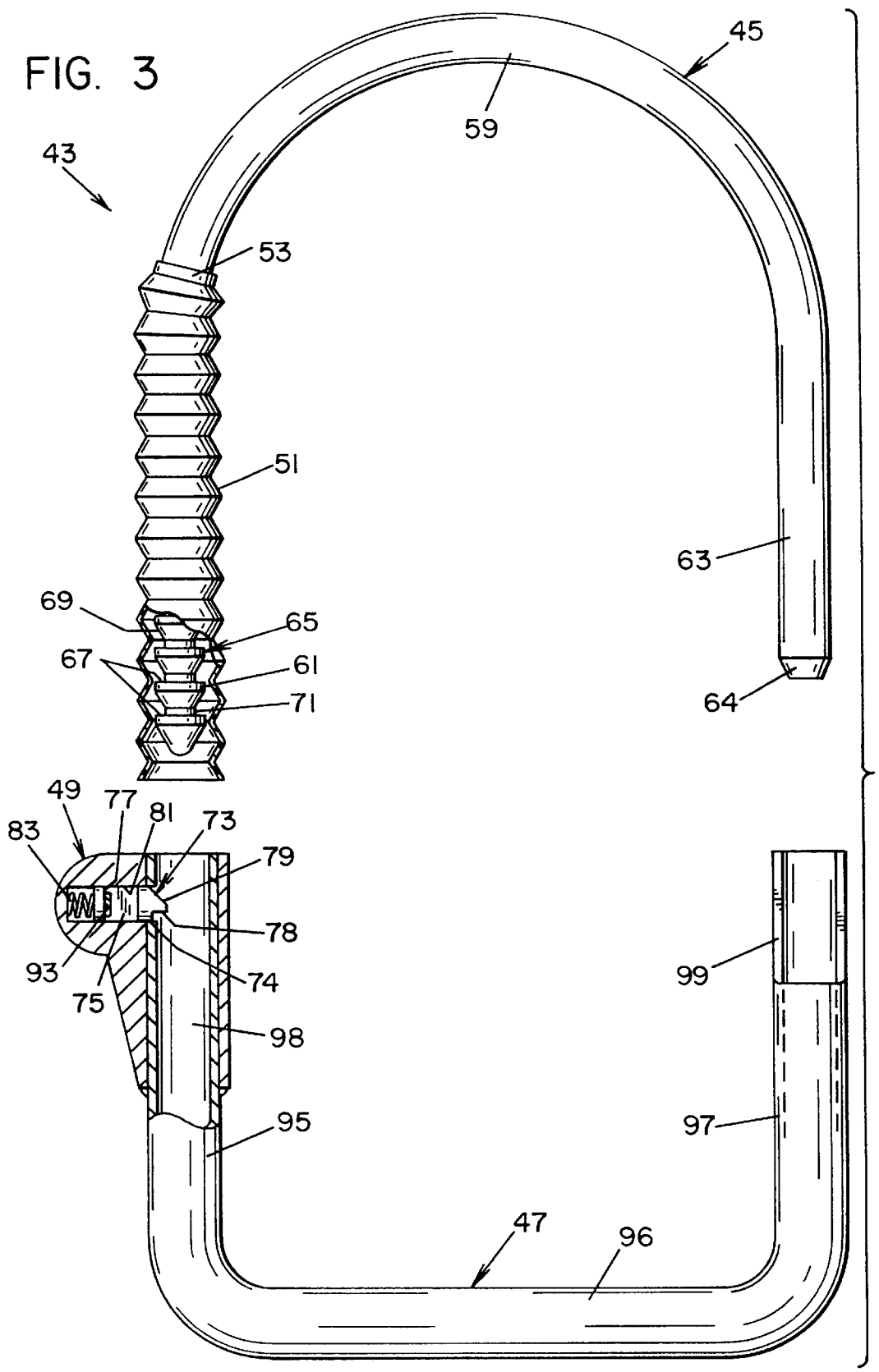
FIG. 3 is an elevation of the same device disassembled, shown partially in cross section.

FIG. 2 shows the security device 43 of the present invention in a fully closed position and FIG. 3 shows it in the open or extended position. The device 43 comprises a rod 45 preferably fabricated from case-hardened steel, said rod consisting of a pair of parallel rod arms comprising first arm 61 and second arm 63 joined together by the curved base or bight 59 of the rod. Sleeve 47 preferably fabricated from a piece of steel tubing, is shown in the shape of a U having a base 96 joining a first tubular sleeve 95 and a second tubular sleeve 97 parallel to the first. Lock housing 49 telescopically engages said first sleeve 95 and is secured thereto by suitable means such as brazing or welding. The lock housing includes lock means 48, to be hereinafter described in greater detail. Flexible boot 51, secured to rod arm 61 contacts lock housing 49 and the individual bellows or accordion pleats are compressed or folded together when the ratchet teeth telescopically engage said first tubular sleeve 95.

The flexible boot 51 in a normally extended position as shown in FIG. 3 surrounds the portion of the first rod arm 61 having the ratchet teeth 65 thereon. The boot 51 as shown includes a flange 53 which surrounds rod arm 61. The flange 53 may be of the same material as the boot, being an integral part thereof gripping the arm 61 with a compression fit. Alternatively, it may be a metal sleeve molded to the end of the boot and secured to the rod by means such as an adhesive, spot welding, or a set screw.

The lock 48 contains a pawl 73 in blind hole 81, said pawl having an angular end surface 79 urged into the passageway 74 in sleeve arm 95 by spring 83. Second sleeve arm 97 may contain a notch 99 to facilitate assembly of the security device. The first arm 61 of rod 45, containing the ratchet teeth, is equal in length or alternately is slightly longer by about ½" to 1½" than the second arm 63. During assembly, the first arm 61 is inserted into the first parallel sleeve arm 95 a short distance after which the rod may be pivoted until the second arm 63 contacts and engages the notch 99 of the second sleeve arm 97 whereupon the tapered end 64 facilitates the telescopic engagement of the two arms of the rod into the two parallel sleeve arms of sleeve 47.

The security device of the present invention preferably employs locking mechanisms similar to those used in an automobile security devices of the type commonly referred to as "The Club" and "Super Club." The details and modifications of these locking mechanisms are shown in the following U.S. patents, the teachings of which are incorporated herein by reference; U.S. Pat. No. 4,738,127 issued Apr. 19, 1988; U.S. Pat. No. 4,856,308 issued Aug. 15, 1989; U.S. Pat. No. 4,935,047 issued Jun. 19, 1990 and U.S. Pat. No. 5,277,042 issued Jan. 11, 1994. Briefly, these patents describe a plurality of longitudinally extending lock engaging means comprising projections or spaced grooves on a case-hardened steel rod which telescopically engages a sleeve and is capable of being locked to prevent collapsing movement. A suitable key operated device actuates a spring loaded pawl which engages the grooves between adjacent projections to prevent collapse. Alternatively, the lock may involve the use of ball bearings, rather than a pawl, to engage curved grooves that extend longitudinally of the rod. The device is adapted to be locked onto the inside rim of a steering wheel of an automobile. The lock serves to prevent the rod from telescopically collapsing into the sleeve.

Any of the locking features shown in these references may be used, with appropriate modifications, in the lock of the present invention. One specific modification involves the reversal of the directions of the ratchet teeth on the rod. One device described in the previously mentioned patents contains ratchet teeth which are adapted to prevent the rod, when in a locked position, from telescopically collapsing into the sleeve. However, in connection with the present invention, one objective is to prevent the rod from being telescopically removed from the sleeve when the device is locked. Therefore, it is necessary to reverse the direction of the ratchet teeth on the rod from the direction shown in said patents. This feature is clearly shown in FIGS. 4 and 5.

FIG. 4 shows the action of the locking mechanism with the rod arm being inserted into the cylindrical sleeve, while FIG. 5 shows the locking mechanism in the unlocked position, with the pawl in the retracted position thereby permitting the rod arm to be freely removed from the sleeve. The lock housing 49 includes a lock passageway of circular cross section having a diameter corresponding to the outside diameter of the first sleeve so that the lock housing is telescopically receivable over the sleeve. The sleeve contains a sleeve hole 74 extending through the wall thereof. The lock housing includes a blind hole 81 aligned with, and having an inner diameter approximating the diameter of the sleeve hole 74. Lock housing 49 further comprises a lock cylinder hole 85 at right angles to the blind hole 81. The locking mechanism disposed within the lock housing 49 includes a coil spring 83 and a ratchet pawl 73 extending from the coil spring through the sleeve hole and projecting into the annular passageway 98 in the first sleeve arm 95. The ratchet pawl 73 includes an angular end surface 79, a groove 75 and a torque blade surface 77 within the groove 75. The locking means further comprises a key lock cylinder 87 having a key slot 94, (shown in FIG. 7) and a torque blade 93. The torque blade extends into the slot 75 in the ratchet pawl 73 to register and cooperate with the torque blade surface 77.

As shown in FIG. 1, the lock housing is arranged with respect to the U-shaped arms of the security device in such a manner to facilitate locking and unlocking the same, so as not to interfere with securing a bicycle to a post or securing a tire to the frame of the bicycle. Operation of the locking means, when the rod contains ratchet teeth totally circumscribing the rod is shown in FIGS. 4, 5 and 6. A corresponding operation of the lock when the ratchet teeth only partially circumscribe the rod is shown in FIGS. 8–13.

As shown in FIG. 6, the coil spring 83 normally biases the ratchet pawl 73 outwardly of the blind hole 81 into engagement with the inner cylindrical surface 71 of the ratchet teeth 65. Movement of the rod member through the annular passageway 98 of the first sleeve 95 indicated by the arrow in FIG. 4 causes the conical bearing surface 69 of the ratchet teeth to act against the angular end surface 79 of the pawl, whereby the pawl 73 is biased into the blind hole 81 thereby compressing spring 83. As each ratchet tooth passes the pawl, the spring 81 urges the pawl back into the annular space between the conical surfaces, causing the clicking ratchet sound common to this type of device. Use of the key lock cylinder 87 to rotate torque blade 93 to act against the torque blade surface 77 of the pawl, as shown in FIG. 5, holds the pawl in a position retracted from the annular passageway, thereby permitting withdrawal of the rod arm 61 from sleeve 95. However, with the pawl in the position shown in FIG. 4, the stop surface contact 78 of the pawl abuts the stop surface 67 of the ratchet tooth thereby preventing the rod arm 61 from being withdrawn from the first sleeve. This represents the device in the locked position. The key lock cylinder is retained within the key hole by locking pin 89.

Figure 7:
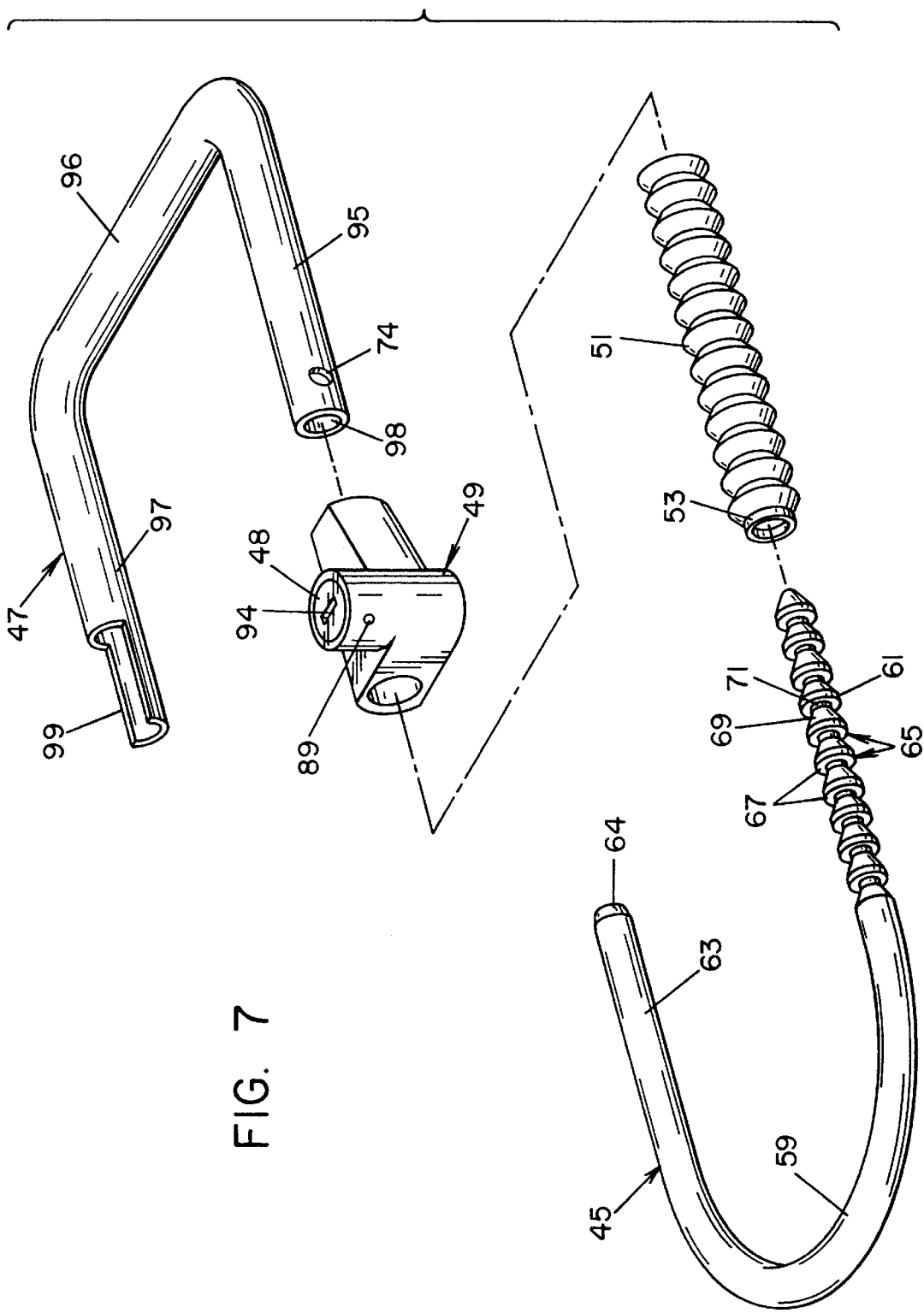
FIG. 7 is an exploded perspective view of the component parts of the embodiment of the present invention shown in FIGS. 1–6.

FIG. 7 shows an exploded view of the device of the present invention comprised of four component parts including steel rod 45, boot 51, lock housing 49 and sleeve 47. Clearly shown in this view is the hole 74 in the first parallel sleeve arm 95. This hole is adapted to coincide with the pawl (not shown), engaged in the blind hole within the lock housing 49. Clearly shown in the second sleeve arm 97 is the notch 99 which may be incorporated into the device to facilitate assembly of the parts.

It will be noted in FIG. 7 that the boot 51 is comprised of a plurality of longitudinally juxtaposed, integrally joined compressible bellows in the normally extended state. The relaxed length of the bellows is sufficient to cover all of the longitudinally spaced ratchet teeth 65 on the first arm 61 of rod 45. Means such as flange 53 bonded to the bellows is adapted to secure the bellows to the arm 61 immediately beyond the ratchet teeth in the manner previously described.

The boot useful in this invention is typically prepared by molding a rubber or elastomeric composition into shape and curing or vulcanizing the shape under elevated temperatures and pressures. The composition is compounded with suitable cross linking agents and fillers. It preferably includes antioxidizing agents and other additives to prevent the boot from cracking and crazing upon flexing, stretching and exposure to sunlight and other atmospheric and weather related conditions. When cured, the rubber or elastomer is transformed from a thermoplastic to a thermosetting material.

Most cured rubbers and elastomers having acceptable deformation and elastic recovery properties coupled with good weathering characteristics are suitable for use in the present invention. The selection, compounding and molding of these materials are carried out according to established techniques well known in the trade. Examples of suitable elastomers and rubbers are butyl rubber, neoprene and natural rubber (polyisoprene). Other elastomers including certain polyurethane compounds and polychloroprene may be used.

Instead of using compressible bellows, other means may be employed for providing an elastic protective covering for the ratchet teeth. Thus, an elastomer having very good elongation properties may be formed into a cylindrical sheath with one end detachably or permanently joined to the rod immediately beyond the teeth and the other end joined to the sleeve or the lock housing. Thus, as the rod is retracted from the sleeve, the sheath elongates to surround the teeth as they are exposed. This variation can be used with the ratchet teeth continuously engaged with the sleeve while still permitting the second rod arm to become disengaged from the notch in the second sleeve arm and to be rotated with respect thereto as previously described to permit coupling and uncoupling of the security device from the cycle.

Although the embodiments hereinabove described involve the use of ratchet teeth that totally circumscribe rod 61, it can be readily determined that there may be no need to be able to rotate the rod 45 in a full 360 degree arc in order to secure the bicycle to a tree, post or other anchor. In fact, FIGS. 8–11, and 13–14 show embodiments where the ratchet teeth do not fully circumscribe the rod.

FIG. 8 shows rod 145 axially aligned with arm 195 of sleeve 147, said rod adapted to be inserted in annular passageway 198. A plurality of ratchet teeth 165 are disposed longitudinally along rod 145, each of said teeth comprising a stop surface 167 and a partial frusto-conical surface 169 connecting inner partially cylindrical surface 171 with outer cylindrical surface 172. The ratchet teeth are preferably machined into the rod according to standard techniques well known in the trade.

As in the previous embodiment, a lock housing 149 fits over sleeve arm 195 and is securely coupled thereto by compression fit, welding or other appropriate means. The lock housing contains a blind hole 181 in which a spring 183 bears against the ratchet pawl 173 urging the pawl through sleeve hole 174 into annular passageway 198. The operation of the locking mechanism is similar to that described in connection with the previous embodiment. The ratchet pawl 173 contains a groove 175 into which extends torque blade 193. This blade comprises part of the lock cylinder 187 positioned in lock cylinder hole 185 and held in place by locking pin 189. Rotation of the torque blade 193 by the use of a key in the lock cylinder 187 will cause said torque blade to bear against the torque blade surface 177 to urge the pawl 173 out of the annular passageway 198 thereby permitting free movement of rod 145 into and out of sleeve arm 195.

FIG. 10 shows the positional relationship of the bottom surface or bight 159 of the rod 145, when the two parallel arms of rod 145 are engaged with the corresponding arms of sleeve 147. It will be noted that the end 180 of the pawl 173 is curved rather than straight as shown in the FIG. 6 embodiment. The curved surface contacts the inner semi-cylindrical surface of 171 of the tooth 165. When in this position, stop surface contact 178 of pawl 173 abuts stop surface 167 thereby preventing removal of rod 145 from sleeve 147. However, as previously described, further movement of the rod into the sleeve when the device is unlocked, is achieved as each of the conical surfaces 169 pushes pawl 173 into blind hole 181 compressing spring 183 until the outer surface 172 of tooth 165 passes the curved edge of the pawl whereupon the spring 183 biases the pawl against the next adjacent inner surface 171.

The length of the two parallel arms of the rod 145 may be the same. Alternatively, the first parallel arm 161, may be slightly longer e.g. ½" to 1½" than said second parallel arm, thereby permitting the first arm 145 to be inserted into the first arm 195 of sleeve 147 prior to the second arm engaging the second sleeve arm. At the same time, if the first rod arm 161 is inserted far enough so that the teeth become ratcheted against the ratchet pawl, mounting of the security device on the cycle, and securing it to a post or other security means is facilitated. This permits the first arm to be rotated about 90 degrees with respect to the second arm, as shown in FIG. 11. Thereafter the rod 145 is moved to the position shown in FIG. 10 whereupon the second rod arm engages the second sleeve notched if desired in the same manner previously described.

Another variation of the partially circumscribing ratchet teeth is seen in FIGS. 12 and 13. Shown are the two parallel arms 361, 363 joined to each other by bight 359 to form a U-shaped rod 345. The rod is poised above a second U-shaped member 347 with two tubular arms 395, 397 parallel to one another and adapted to receive the arms 361, 363.

The lock housing includes a short cylindrical sleeve 382 fitted into the first tubular arm 395, and secured thereto by spot welds 384 or by other means such as a compression fit. The end of the arm may be bored or reamed out to provide an abutment shoulder 386.

A layer of a cushioning material such as a plastisol 339 preferably is applied to the exposed portions of the device that are likely to contact and possibly mar the surface finish of the bicycle. In addition, a hard plastic cap 388 fits over the end of the second sleeve arm 397 for protection and to provide a wear-resistant opening to receive rod arm 363. The cap is joined to the sleeve by an adhesive or other suitable means.

The ratchet teeth 365 are evenly spaced along the outer surface of the first rod arm 361. Each of the teeth includes a curved outer surface which with the rest of the rod forms a narrow cylindrical surface 372. An abutment shoulder 367 extends radially in from the curved surface 372 to provide a stop surface to contact the corresponding surface 378 of pawl 373. Each tooth includes a second bearing surface 369 extending diagonally inwardly as shown.

Each abutment shoulder 367 is joined to the bearing surface 369 of the next adjacent tooth by a flat inner surface 371. Typically the leading edge 380 of the pawl likewise is flat. In the locked position, the ratchet teeth 365 are positioned with respect to the pawl so that the diagonal surface 369 of each tooth 365 contacts the corresponding surface 379 of the pawl as the arms 361,363 are inserted into the sleeves 395,397. This urges the pawl out of the passageway 398 while compressing the spring 383 allowing the arm to collapse into the sleeve. When, however, an effort is made to separate the rod from the sleeve, the spring urges the pawl contact surface 378 into abutting relationship with the stop surface 367, thereby resisting the withdrawal.

FIGS. 14–16 show yet another embodiment of the present invention utilizing an alternative locking mechanism comprising semi-circular grooves along one arm and a semi-arcuate locking member adapted to be engaged with or disengaged from the grooves. Locating or positioning means comprising spherical bearing 455 and helical spring 483 are located in blind hole 462 in the housing. The hole 462 communicates with passageway 498 through aperture 474 in the sleeve 447. The diameter of the spherical bearing is slightly greater (approximately 10–30%) than the diameter of the aperture, thereby restricting complete access of the bearing into the passageway. Nevertheless, the bearing extends into the passageway a sufficient distance so as to engage the semi-circular grooves 468 in arm 461. The spring 483 is compressed within the blind hole 462 by retainer 460 whereby the bearing is constantly biased toward said aperture 474.

As noted in FIG. 15, the housing 449 includes a boss 450 laterally offset with respect to the axis of passageway 498 and arm 461. A key lock cylinder 487 is mounted in a recess within said boss 450. The lock includes a locking member 476 having a semi-circular arcuate surface 490 and a flat portion 492. The sleeve 447 contains a slotted aperture 470 which intersects the passageway 498. The bore of the key lock 487 is aligned relative to passageway 498 such that the arcuate surface 490 of locking member 476 is partially disposed within passage 498 when the lock is engaged, as shown in FIG. 14. However, when the key lock is turned 180°, the locking member is rotated so that the flat surface 492 does not intercept the passageway 498 as shown in FIG. 16, whereupon the arm 461 may be freely removed from sleeve 495. Preferably the spherical bearing 455 and the locking member 476 are disposed opposite to each other in the housing 449 such that they align with the same groove 468 on arm 461. However, this is not deemed to be an essential feature. Instead, the locking member and the bearing may be displaced axially from one another by a distance equal to the spacing between two or more grooves 468. Additional details of the locking mechanism similar to that used in this embodiment are shown in U.S. Pat. Nos. 4,738,127 and 4,856,308, previously mentioned.

With the locking member in a locked position as shown in FIG. 14, movement of the sleeve along the axis of arm 445a is prevented by the arcuate surface 490 extending into the semi-circular groove 468. However, as shown in the FIG. 16, with the locking member rotated 180° so that the arcuate surface 490 is removed from the groove, the relative movement between arm 445a and sleeve 447 may be effected in either direction, resisted only by the relatively moderate pressure exerted by bearing 455 spring biased through aperture 474 into contact with said grooves 468.

This embodiment is shown and described with lock engaging grooves on only one arm. It should be understood that both arms of the rod can be provided with grooves and that each sleeve of the other U-shaped member can contain a separate lock engaging the grooves on one of the arms, without departing from the scope of the invention. Furthermore, it is understood that the grooves need not totally circumscribe the arm. Instead, they can be positioned along one side of the arm which engages the lock. Also, the lock can function without the use of a ball bearing biased into contact with the grooves. However, the use of the ball bearing facilitates the alignment of the semi-arcuate locking member with the grooves.

Although the plastisol coating can be applied to most of the exposed surfaces of the lock, portions of the rod arms which are telescopically received into the sleeves are not coated. To provide added protection for these arms and the grooves or ratchet teeth from corrosion and physical damage, while concurrently increasing the protection of the surface of the bicycle from dings, dents or scratches, one or more rubber boots may be used, generally as shown in FIG. 17. This Figure shows a security device 543 comprising first and second U-shaped members 545 and 547. A first protective boot 551a is associated with and covers arm 545a and a second protective boot 551b covers arm 545b. Each boot preferably comprises an elastomer or polymer formed with accordion-type pleats to make a hollow compressible bellows. One end of each boot is secured to the respective arm with a compression fit or means such as a clamp or ring 595a, 595b held in place by welding, a set screw or the like.

The two arms 595, 597 of the U-shaped sleeve 347 engage the two rod arms 545a and 545b, compressing the bellows as shown. The metal surfaces of the device when locked are separated from the bicycle frame and/or the wheel by the rubber boots 551a, 551b and by and by plastisol layer 539. Marring or scratching of the bicycle surface is thereby minimized while at the same time the ratchet teeth or the semi-circular grooves 563 on arm 545a are protected from physical damage and corrosion. The use of a boot at least on the arm 545a also reduces the possibility of the user being pinched or by the ratchet teeth or grooves while using the device to secure the bicycle to an immovable object.

A lock 548 is enclosed in lock housing 549 which includes short tubular sleeve 582 joined by suitable means such as a press fit or spot weld to tubular arm 595. Annular passageway 548 in the sleeve 582 slidably receives rod arm 545a. Movement of the U-shaped sleeve 547 away from the bight 545c permits the compressed bellows due to their natural resiliency to elongate to their normal length to cover and protect the rod arm of rod 545a. In the same manner as described in connection with the device shown in FIG. 12, a plastic cap is used to cover the end of second sleeve arm 597.

FIG. 18 shows another adaptation of the present invention wherein a security device is used to securely attach the wheel of a bicycle to the frame thereof, thereby preventing the removal and theft of the wheel. As previously noted, the portion of the bike shown in FIG. 18, includes a down tube 203, seat tube 205 and chain stay 209 joined to a bracket shell 207. Cranks 227 are attached to shaft 208 extending through the bracket shell, and are rotatably engaged therewith through the use of suitable ball bearings or the like. Pedals 229 are attached to the free ends of the cranks 227.

Seat stay 211 and chain stay 209 converge to form a dropout 213 adapted to hold the rear wheel 217. This wheel includes a tire 219, rim 221 and spokes 223 connected to axle 215. Because of the ease of removing and stealing the wheels from a bicycle, particularly with quick release connections, the rear wheel is secured to the seat tube by security device 243. The device is smaller than but is otherwise similar to the embodiments already described in detail. The device consists of a generally U-shaped rod 245 adapted to engage corresponding arms of sleeve 247. The rod contains lock engaging means such as ratchet teeth or semicircular grooves covered by boot 251, the entire device being secured against separation of the rod 245 from the sleeve by lock means 248 in housing 249. The lock housing 249 is covered by a protective envelope 235.

As previously mentioned, the bellows are molded or otherwise formed from a suitable elastomer or rubber. The other components of the present device—the two U-shaped members and the parts of the locking mechanism are made from materials that are reasonably capable of withstanding efforts to pick or break the lock, to cut through the rod or the sleeve or to force the two U-shaped members apart. As noted, steel tubing and a case hardened steel rod have been found to be satisfactory materials of construction for "The Club" and "Super Club" and also work well in the production of the device of the present invention. However, there is a tendency to use light weight materials in the production of bicycles and their components as well as accessories carried on the bike or on the person of the bike rider. For this reason, the use of light weight materials such as steel alloys, titanium and its alloys, aluminum alloys, and non metallic composites may be considered for the construction of all or some of the components of this device. The practicality of their use is governed by the ability to form them into the desired shape and by the ability of the device to prevent the thefts intended to be discouraged by its use.

Preferably, a suitable coating of a plastisol is applied to all of the exposed metal surfaces of the device that are not covered by the boot and that may contact the bike. This coating, cooperative with the boot will prevent the device from scratching or otherwise marring the bike finish. If the device is carried on the bike when the device is not in use, the polymer coating also prevents annoying metal to metal noise as the bike is moving.

As an added element of protection for the lock mechanism, whether a combination lock or a key lock, a bubble package or envelope 235 (FIG. 18) may be used. This is particularly advantageous on locks that are carried on mountain bikes and other types of all terrain vehicles where exposure to dirt, mud and other debris is commonplace and spills are somewhat routine. The frequent bumping and jarring which is encountered under these conditions is absorbed by the shock absorbing air bubbles. The production of the material for the bubble packaging is well known and does not comprise a part of the present invention. The shock insulation is secured in place around the lock by heat sealing, by adhesive binding or by other similar means such as tape. The transparency of the bubble pack material facilitates the visualization of the numbers or symbols on the lock.

Typically bubble wrap materials are made from suitable laminated sheet plastic such as polyethylene or other polyolefin. Other similar flexible coverings such as vinyl and/or leather may be used in place of the bubble wrap, and may include a flap, held in place with a material such as Velcro, and adapted to cover and protect the key lock or the tumblers against exposure.

It can readily be determined that the invention includes other variations and modifications without departing from the scope thereof. For example instead of making the rod arm containing ratchet teeth or grooves longer than the smooth rod arm, the same effect can be achieved by making the first sleeve arm longer than the second sleeve arm. Furthermore, the bellows-shaped boot can be temporarily or detachably connected to the arm with the ratchet teeth or grooves rather than being permanently affixed thereto.

It will be appreciated that other modifications or alterations can be made in the present invention without departing from the scope thereof as covered by the appended claims and their equivalents.

Having thus described the invention, it is claimed:

1. A theft deterrent device comprising a) a first generally U-shaped member, b) a second generally U-shaped member, each member having first and second parallel arms, the parallel arms of the first member being telescopically received into the parallel arms of the second member, the first member containing a plurality of ratchet teeth spaced along its first parallel arm, and c) lock means associated with the second U-shaped member, said lock means including a pawl engaging individual ratchet teeth when said lock means is locked, to prevent said members when engaged from being separated, while allowing said members to be telescoped together, and when said lock means is unlocked, allowing the members to be freely disengaged when telescoped away from one another, wherein the first U-shaped member comprises a rod, with the ratchet teeth spaced uniformly along said first parallel arm thereof, wherein the parallel arms of said second U-shaped member comprise first and second tubular sleeves to telescopically receive the first and second arms of said rod, said device further including protective means for progressively covering the ratchet teeth as the two members are telescoped away from one another, wherein the progressive covering means includes flexible bellows adapted to elongate and surround the ratchet teeth as the first arm of said rod member is telescoped out of the first tubular sleeve of said second U-shaped member, wherein said bellows includes a first end that is secured to said rod and a second end that contracts toward and elongates away from said first end as said first arm is moved into and out of the first tubular sleeve, wherein the two arms of said rod member are unequal in length with the first arm containing the ratchet teeth extending about ½" to about 1½" beyond the second arm.

2. The device according to claim 1, wherein the second tubular sleeve terminates in an open end, and said open end includes a notch to facilitate engagement of said second arm of said rod member into said sleeve, when telescoping the members together.

3. The device according to claim 2, wherein said lock housing is enclosed in a protective cover.

4. The device according to claim 3, wherein the protective cover comprises a bubble wrap material.

5. A theft deterrent device comprising a) a first generally U-shaped member having first and second parallel arms and a bight, at least the first of said arms containing a plurality of lock engaging means spaced along a portion of its length, said lock engaging means comprising a plurality of semi-circular grooves evenly spaced longitudinally along and at least partially circumscribing said arm, b) a second generally U-shaped member having first and second parallel arms for telescopically engaging respectively the first and second parallel arms of said first member, said second members being movable toward and away from said bight of said first member along the axis of said arms, and c) lock means including a locking mechanism operable between an unlocked position whereby relative movement of the two members in an axial direction is freely permitted and a locked position whereby said relative movement is prevented, wherein the lock means further includes positioning means for positioning said lock relative to said grooves, wherein said lock means, including the positioning means and a locking mechanism, is contained in a lock housing, said lock housing being integral with said second U-shaped member and having a passageway therethrough to axially receive said first arm of said first U-shaped member, wherein said positioning means includes a blind hole at right angles to said passageway, said blind hole having an opening communicating with said passageway, a spherical bearing contained in said blind hole and having a diameter slightly greater than said opening, said bearing spring biased into said opening to partially intersect said passageway and to contact said semi-circular grooves, wherein said lock includes a generally cylindrical key activated locking mechanism mounted within the lock housing at a location whereby operation of the locking mechanism does not impede the movement of the spherical bearing into and out of the semi-circular grooves, said locking mechanism having a flat portion on one side thereof and an arcuate portion opposite thereto and conforming to the curvature of said semicircular grooves, said locking mechanism being rotatable between a locked position wherein said arcuate portion intersects one of said grooves to arrest axial movement of the bar with respect to at least said first arm, and an unlocked position whereby said axial movement is interrupted solely by the spherical bearing spring biased into and out of each successive semi-circular groove, wherein a coil spring is positioned in said blind hole to bias said spherical bearing through said opening into contact with said semi-circular grooves, wherein the lock housing is enclosed in a protective cover.

6. The device according to claim 5, wherein the protective cover comprises a bubble wrap material.

* * * * *